United States Patent

Morita et al.

Patent Number: 5,516,858
Date of Patent: May 14, 1996

[54] EPOXY GROUP-CONTAINING SILICONE RESIN AND COMPOSITIONS BASED THEREON

[75] Inventors: Yoshitsugu Morita; Junji Nakanishi; Ken Tanaka; Toshio Saruyama, all of Chiba, Japan

[73] Assignee: Dow Corning Toray Silicone Co., Ltd., Tokyo, Japan

[21] Appl. No.: 419,685

[22] Filed: Apr. 10, 1995

Related U.S. Application Data

[62] Division of Ser. No. 226,539, Apr. 12, 1994.

[51] Int. Cl.⁶ .................... C08F 283/00; C08G 77/00
[52] U.S. Cl. .................... 525/478; 525/476; 525/477; 525/523; 528/10; 528/31; 528/33; 528/43
[58] Field of Search .................... 528/10, 31, 33, 528/43; 525/476, 477, 478, 523

[56] References Cited

U.S. PATENT DOCUMENTS

| | | | |
|---|---|---|---|
| 4,859,723 | 8/1989 | Shibara | 525/476 |
| 4,880,882 | 11/1989 | Morita et al. | 525/446 |
| 5,102,960 | 4/1992 | Imai | 525/476 |
| 5,206,328 | 4/1993 | Okamura | 528/27 |
| 5,262,506 | 11/1993 | Okawa | 528/27 |
| 5,279,860 | 1/1994 | Griswold | 525/476 |
| 5,280,098 | 1/1994 | Witucki | 525/476 |
| 5,283,309 | 2/1994 | Morita | 528/27 |

FOREIGN PATENT DOCUMENTS

| | | |
|---|---|---|
| 0464706 | 1/1992 | European Pat. Off. . |
| 0484119 | 5/1992 | European Pat. Off. . |
| 136816 | 1/1981 | Japan . |
| 145942 | 11/1981 | Japan . |
| 53655 | 6/1983 | Japan . |
| 27095 | 9/1987 | Japan . |

OTHER PUBLICATIONS

Patent Abstracts of Japan, vol. 6, No. 24, Feb. 12, 1982 The Patent Office Japanese Government, p. 70 C 91; and JP–A–56 145 942 (Shinetsu).

*Primary Examiner*—Melvyn I. Marquis
*Assistant Examiner*—Randy Gulakowski
*Attorney, Agent, or Firm*—Alexander Weitz

[57] ABSTRACT

There is disclosed a curable resin composition that has an excellent fluidity prior to curing and that cures to form a molding resin that is flexible, highly moisture resistant, and strongly resistant to heat shock, said composition comprising (A) 100 weight parts of a curable resin; and
(B) 0.1 to 500 weight parts of an epoxy group-containing silicone resin that has the general formula $$(R^1SiO_{3/2})_a(R^2R^3SiO_{2/2})_b(SiO_{4/2})_c$$

wherein $R^1$, $R^2$ and $R^3$ each represents a group selected from the group consisting of an epoxy group-containing organic group and a monovalent hydrocarbon group with the proviso that said epoxy group-containing organic groups comprise 0.1 to 40 mole percent of the total silicon-bonded organic groups in said silicone resin (B), a is a positive number, b is zero or a positive number, c is zero or a positive number, b/a has a value of zero to 10, c/(a+b+c) has a value of zero to 0.3 and said silicone resin (B) has a glass-transition temperature of –90° C. to 150° C.

6 Claims, No Drawings

EPOXY GROUP-CONTAINING SILICONE RESIN AND COMPOSITIONS BASED THEREON

This is a divisional of copending application Ser. No. 08/226,539, filed on Apr. 12, 1994.

FIELD OF THE INVENTION

The present invention relates to an epoxy-containing silicone resin and to a method for the preparation thereof. More specifically, the present invention relates to an epoxy-containing silicone resin that contains the trifunctional siloxane unit (hereinafter referred to as the T unit) and that has a distinct glass-transition temperature in the range of −90° C. to 150° C. The invention also relates to a method for the preparation the epoxy-containing silicone resin.

The present invention also relates to a curable resin composition based on the epoxy-containing silicone resin described above.

BACKGROUND OF THE INVENTION

T unit-containing branched silicone resins are highly heat-resistant and have an excellent capacity for film-formation, and for these reasons are used as electrical insulating materials, heat-resistant paints and coatings, protective coatings, physical property-improvers for curable organic resins, precursors for copolymers (in combination with organic resin monomers), and so forth. Among these silicone resins, the epoxy-containing DT silicone resins and epoxy-containing DTQ silicone resins (D=difunctional siloxane unit, Q=tetrafunctional siloxane unit) are used as physical property-improvers for curable epoxy resins, and these resins have been proposed in large number (Japanese Patent Application Laid Open Number Sho 56-145942 and Japanese Patent Publication Numbers Sho 58-53655 and Sho 62-27095).

The epoxy-containing silicone resins proposed in Japanese Patent Application Laid Open Number Sho 56-145942 and Japanese Patent Publication Numbers Sho 58-53655 and Sho 62-27095 are prepared either by the cohydrolysis and condensation of epoxy-containing trialkoxysilane and diorganodialkoxysilane or by the base-catalyzed equilibration polymerization of cyclic diorganosiloxane and epoxy-containing trialkoxysilane. However, due to the use of these particular preparative methods, the resulting epoxy-containing silicone resins have broad molecular weight distributions and do not exhibit a softening point or a distinct glass-transition temperature. Moreover, they have poor stabilities because their molecules contain large quantities of silanol groups or silicon-bonded alkoxy groups. These drawbacks serve to limit their applications.

Moreover, the methods proposed in Japanese Patent Application Laid Open Number Sho 56-145942 and Japanese Patent Publication Numbers Sho 58-53655 and Sho 62-27095 for the preparation of epoxy-containing silicone resins are incapable of providing control over the molecular weight, softening point, and glass-transition temperature of the epoxy-containing silicone resin product. In consequence thereof, these methods are incapable of the highly reproducible synthesis of epoxy-containing silicone resins having a freely selectable molecular weight, softening point, and distinct glass-transition temperature in the range of −90° C. to 150° C.

Bodying is a known technology that consists of the base-catalyzed depletion of the silanol groups in a silicone resin prepared by the hydrolysis and condensation of organoalkoxysilane. However, the molecular weight of the silicone resin afforded by bodying is simply increased, while control of the molecular weight, softening point, and glass-transition temperature is not possible. Furthermore, the molecular weight, softening point, and glass-transition temperature of the resulting epoxy-containing silicone resin are substantially altered as a function of the degree of bodying, and this basically eliminates any possibility for the highly reproducible synthesis of epoxy-containing silicone resin that has a freely selectable molecular weight, softening point, and distinct glass-transition temperature in the range of −90° C. to 150° C.

Curable resin compositions cure to yield resins that have excellent electrical properties (dielectric properties, volume resistivity, insulation breakdown strength, and so forth) and excellent mechanical properties (flexural strength, compressive strength, impact strength, and so forth), and for this reason are used in the widest range of applications.

However, the resins afforded by the cure of such curable resin compositions are stiff and inflexible and they exhibit a large cure shrinkage. As a result, when these resins are used as sealants for electrical/electronic elements or as coatings or adhesives, large forces are applied to the substrate, adherend, or electrical/electronic element, and the resin is subject to cracking and/or rupture, resin-sealed electrical/electronic elements may be destroyed, and gaps may be produced between the resin and adherend or between the resin and electrical/electronic element.

In addition, curable resin compositions cure to give resins whose thermal expansion coefficient is larger than that of electrical/electronic elements. When an electrical/electronic element sealed with such a resin is repeatedly subjected to thermal shock, the reliability of the element is reduced due to cracking in the resin, destruction of the resin-sealed element, and the generation of gaps between the resin and the element.

In order to improve the flexibility, moisture resistance, and heat-shock resistance of these cured resins, curable resin compositions composed of curable resin and organopolysiloxane have been proposed in large number. Curable resin compositions of this type are exemplified by the curable resin composition proposed in Japanese Patent Application Laid Open Sho 56-136816 and the previously cited Japanese Patent Application Laid Open Number Sho 56-145942. The former is composed of epoxy resin, (epoxy+methoxy)-containing organopolysiloxane, curing agent, and inorganic filler. The latter is composed of an epoxy resin+silanol-containing organopolysiloxane mixture, epoxy-functional organopolysiloxane, inorganic filler, and curing catalyst.

The epoxy-functional organopolysiloxanes used in the curable resin compositions proposed in Japanese Patent Application Laid Open Numbers Sho 56-136816 and Sho 56-145942 are, however, prepared by the cohydrolysis of epoxy-functional alkoxysilane and another type of alkoxysilane, and curable resin compositions prepared by the addition of such epoxy-functional organopolysiloxanes yield cured resins that do not exhibit a satisfactory flexibility, moisture resistance, or heat-shock resistance.

The present invention takes as an object the introduction of epoxy-containing silicone resin that contains the T unit and that has a distinct glass-transition temperature in the range of −90° C. to 150° C. An additional object of the present invention is the introduction of a method for the preparation of epoxy-containing silicone resin that is capable of a highly reproducible synthesis of epoxy-containing silicone resin that contains the T unit and that has a freely selectable molecular weight, softening point, and distinct glass-transition temperature in the range of −90° C. to 150° C.

The present invention also takes as its object the introduction of a curable resin composition, based on the above silicone resin, that has an excellent fluidity prior to curing and that cures to form resin that is very flexible, highly moisture resistant, and strongly resistant to heat shock.

SUMMARY OF THE INVENTION

The present invention relates to a curable resin composition comprising:

(A) 100 weight parts of a curable resin; and (B) 0.1 to 500 weight parts of a epoxy group-containing silicone resin that has the general formula $$(R^1SiO_{3/2})_a(R^2R^3SiO_{2/2})_b(SiO_{4/2})_c$$

wherein $R^1$, $R^2$, and $R^3$ represent an epoxy group-containing organic group or a monovalent hydrocarbon group, with the proviso that epoxy group-containing organic groups comprise 0.1 to 40 mole % of the total silicon-bonded organic groups in component (B), a is a positive number, b is zero or a positive number, c is zero or a positive number, b/a has a value of zero to 10, and c/(a+b+c) has a value of zero to 0.3, said Resin (B) having a glass-transition temperature of −90° C. to 150° C.

The invention also relates to a process for preparing the epoxy group-containing silicone resin (B).

DETAILED DESCRIPTION OF THE INVENTION

The curable resin comprising component (A) is the base material of the composition in accordance with the present invention, and its type is not specifically restricted. The curable resin of component (A) is specifically exemplified by phenolic resins, formaldehyde resins, xylene resins, xylene-formaldehyde resins, ketone-formaldehyde resins, furan resins, urea resins, imide resins, melamine resins, alkyd resins, unsaturated polyester resins, aniline resins, sulfonamide resins, silicone resins, epoxy resins, and copolymer resins from among the preceding. Moreover, mixtures of two or more of the preceding curable resins can also be used as component (A). The curable resin is preferably selected from the group comprising epoxy resins, phenolic resins, imide resins, and silicone resins. The curing mechanism of component-(A) is not specifically restricted, and in specific terms component (A) can be, for example, a thermosetting resin, UV-curing resin, or moisture-curing resin. Finally, the physical state of component (A) at room temperature is not specifically restricted, and it may be a liquid or solid at room temperature.

Components other than the curable resins exemplified above can be admixed into the component (A) of the curable resin composition of the present invention. These additional components are exemplified by curing agents, cure accelerators, fillers, photosensitizers, metal salts of higher aliphatic acids, ester waxes, and plasticizers. Curing agents that can be blended into component (A) are specifically exemplified by organic acids such as carboxylic acids and sulfonic acids (including their anhydrides); hydroxy-functional organic compounds; organosilicon compounds that contain the silanol group, alkoxy group, or halide; and primary and secondary amino compounds. Mixtures of two or more types of these curing agents can also be used. Cure accelerators that can be blended into component (A) are specifically exemplified by tertiary amine compounds; organometallic compounds based on such metals as aluminum or zirconium; organophosphorus compounds such as phosphines; heterocyclic amine compounds; boron complexes; organoammonium salts; organosulfonium salts; and organoperoxides. Fillers that can be blended into component (A) are specifically exemplified by fibrous fillers such as glass fiber, asbestos, alumina fiber, ceramic fiber composed of both alumina and silica, boron fiber, zirconia fiber, silicon carbide fiber, metal fibers, polyester fibers, aramid fiber, nylon fibers, phenolic fibers, natural plant and animal fibers; granular or particulate fillers such as fused silica, precipitated silica, fumed silica, calcined silica, zinc oxide, calcined clay, carbon black, glass beads, alumina, talc, calcium carbonate, clay, aluminum hydroxide, barium sulfate, titanium dioxide, aluminum nitride, silicon carbide, magnesium oxide, beryllium oxide, kaolin, mica, zirconia, and so forth; and mixtures of two or more of the preceding.

The epoxy-functional silicone resin comprising component (B) in the curable resin composition of the present invention functions through its admixture into component (A) to improve the fluidity of the resulting curable resin composition and to improve the flexibility, moisture resistance, and heat-shock resistance of the resin afforded by the cure of the subject curable resin composition. This component (B) has the following general formula.

$$(R^1SiO_{3/2})_a(R^2R^3SiO_{2/2})_b(SiO_{4/2})_c$$

wherein $R^1$, $R^2$, and $R^3$ independently represent an epoxy-containing organic group or one or more groups selected from monovalent hydrocarbon groups. Said monovalent hydrocarbon groups are specifically exemplified by alkyl groups such as methyl, ethyl, propyl, butyl, pentyl, hexyl, and heptyl; alkenyl groups such as vinyl, allyl, butenyl, pentenyl, and hexenyl; aryl groups such as phenyl, tolyl, xylyl, and naphthyl; aralkyl groups such as benzyl, and phenethyl; and substituted alkyl groups such as chloromethyl, 3-chloropropyl, 3,3,3-trifluoropropyl, and nonafluorobutylethyl. The aforesaid epoxy-containing organic group is specifically exemplified by 2,3-epoxypropyl, 3,4-epoxybutyl, 4,5-epoxypentyl, 2-glycidoxyethyl, 3-glycidoxypropyl, 4-glycidoxybutyl, 2-(3,4-epoxycyclohexyl)ethyl, and 3-(3,4-epoxycyclohexyl)propyl. Moreover, the epoxy-containing organic group must comprise 0.1 to 40 mole % of the total silicon-bonded organic groups in component (B). The final cured resin shows a reduced flexibility, moisture resistance, and heat-shock resistance when the epoxy-containing organic group makes up less than 0.1 mole % of the total silicon-bonded organic groups in component (B). On the other hand, when this parameter exceeds 40 mole %, the ultimately obtained cured resin will suffer from sharply reduced mechanical properties. Finally, $R^1$ in component (B) preferably comprises at least 30 mole % of phenyl groups because this yields a very high compatibility between components (A) and (B).

The subscript a in the preceding formula, which indicates the content of trifunctional siloxane unit (T unit), is a positive number. The subscript b, which indicates the content of difunctional siloxane unit (D unit), is zero or a positive number, and the subscript c, which indicates the content of tetrafunctional siloxane unit (Q unit), is zero or a positive number. In addition, b/a is a number in the range of zero to 10. Component (B) having b/a>10 exhibits a very low glass-transition temperature (i.e., <90° C.) and also suffers from a reduced compatibility with component (A). Moreover, c/(a+b+c) is a number in the range of zero to 0.3 because the dispersibility in component (A) is reduced when c/(a+b+c)> 0.3 and the glass transition temperature of the silicone resin is above 150° C.

The number-average molecular weight and the molecular structure of component (B) are not specifically restricted; however, this component preferably has a number-average molecular weight in the range of 300 to 50,000 and more preferably in the range of 500 to 10,000. Component (B) must also have a glass-transition temperature ($T_g$) in the range of −90° C. to 150° C. It is extremely difficult to obtain a uniform blend in component (A) of component (B) with $T_g$>150° C. On the other hand, curable resin compositions prepared by mixing a component (B) with $T_g$<−90° C. into component (A) cure to yield resins having diminished mechanical properties.

Component (B) preferably comprises epoxy-functional silicone resin prepared by first synthesizing silicone resin by the reaction of (I) one type or a mixture of two or more types of organopolysiloxane selected from the group composed of components (i) through (iv) as specified below (excluding the use of component (ii) by itself):

(i) organopolysiloxane composed of siloxane units with the general formula $R^4SiO_{3/2}$ (ii) organopolysiloxane composed of siloxane units with the general formula $R^5R^6SiO_{2/2}$ (iii) organopolysiloxane composed of siloxane units with the general formulas $R^4SiO_{3/2}$ and $R^5R^6SiO_{2/2}$ (iv) organopolysiloxane composed of siloxane units with the general formulas $R^4SiO_{3/2}$, $R^5R^6SiO_{2/2}$, and $SiO_{4/2}$ wherein $R^4$, $R^5$, and $R^6$ independently represent monovalent hydrocarbon groups
and (II) an epoxy-containing alkoxysilane with the general formula $R^7R^8_dSi(OR^9)_{(3-d)}$ or partial hydrolyzate thereof, in which $R^7$ and $R^8$ are selected from epoxy-containing organic groups or monovalent hydrocarbon groups, $R^9$ represents alkyl groups, d=zero or 1 and wherein component (II) is added in a quantity such that the epoxy-containing organic groups in component (II) comprise 0.1 to 40 mole % of the total silicon-bonded organic groups in components (I) and (II), in the presence of water and basic catalyst. The concentration of said silicone resin product is then adjusted with organic solvent and the silicone resin is subjected to an equilibration reaction under the effect of the aforesaid basic catalyst. While the synthesis of the aforementioned epoxy-functional silicone resin of component (B) can generally be carried out by the condensation of the cohydrolyzate prepared from organoalkoxysilane and epoxy-containing alkoxysilane, the epoxy-functional silicone resin afforded by such a preparative method does not exhibit a distinct glass-transition temperature in the range of −90° C. to 150° C. Moreover, this method cannot yield an epoxy-functional silicone resin that is optimized or adapted for the curable resin composition in accordance with the present invention.

Component (I) is the main starting material in the subject preparative method for component (B), and it consists of one type or a mixture of two or more types of organopolysiloxane selected from the group composed of (i) through (iv) as described below. However, component (I) may not consist of component (ii) by itself, and therefore must consist of either an organopolysiloxane mixture or a single organopolysiloxane exclusive of component (ii) by itself. Thus, component (I) as defined herein is exemplified by component (i) by itself; component (iii) by itself; component (iv) by itself; mixtures of components (i) and (ii); mixtures of components (i) and (iii); mixtures of components (i) and (iv); mixtures of components (i), (ii), and (iii);mixtures of components (i), (ii), and (iv); and mixtures of components (i) , (ii), (iii), and (iv). The phenyl group preferably comprises at least 30 mole % of the $R^4$ in the molecules in the subject preparative method for component (B) because this affords a particularly good compatibility between the resulting component (B) and component (A).

The organopolysiloxane comprising the component (i) encompassed by component (I) consists of organopolysiloxane composed of siloxane units with the general formula $R^4SiO_{3/2}$ (T units). $R^4$ in this formula represents monovalent hydrocarbon groups, and said monovalent hydrocarbon groups are specifically exemplified by alkyl groups such as methyl, ethyl, propyl, butyl, pentyl, hexyl, heptyl, and so forth; alkenyl groups such as vinyl, allyl, butenyl, pentenyl, hexenyl, and so forth; aryl groups such as phenyl, tolyl, xylyl, naphthyl, and so forth; aralkyl groups such as benzyl, phenethyl, and so forth; and substituted alkyl groups such as chloromethyl, 3-chloropropyl, 3,3,3 -trifluoropropyl, nonafluorobutylethyl, and so forth. The organopolysiloxane comprising component (i) as defined above is generally known as organopolysilsesquioxane, and is exemplified by ladder-type organopolysilsesquioxane and cage-type organopolysilsesquioxane.

The organopolysiloxane comprising the component (ii) encompassed by component (I) consists of organopolysiloxane composed of siloxane units with the general formula $R^5R^6SiO_{2/2}$ (D units). $R^5$ and $R^6$ in this formula represent monovalent hydrocarbon groups, which may be the same or may differ. The monovalent hydrocarbon groups comprising $R^5$ and $R^6$ are specifically exemplified by the same groups as provided above for $R^4$. The organopolysiloxane comprising component (ii) as defined above is generally known as a diorganopolysiloxane. Its molecular chain terminal groups are not specifically restricted, and may be, for example, the hydroxyl group, alkoxy group, or triorganosiloxy group.

The organopolysiloxane comprising the component (iii) encompassed by component (I) consists of organopolysiloxane constituted of T units with the general formula $R^4SiO_{3/2}$ and D units with the general formula $R^5R^6SiO_{2/2}$. $R^4$, $R^5$, and $R^6$ in the preceding formulas represent monovalent hydrocarbon groups, which may be the same or may differ. These groups are exemplified as before. The organopolysiloxane comprising the component (iii) as defined above is generally known as a DT silicone resin.

The organopolysiloxane comprising the component (iv) encompassed by component (I) consists of organopolysiloxane constituted of T units with the general formula $R^4SiO_{3/2}$, D units with the general formula $R^5R^6SiO_{2/2}$, and siloxane units with the general formula $SiO_{4/2}$ (the Q unit). $R^4$, $R^5$, and $R^6$ in the preceding formulas represent monovalent hydrocarbon groups, which may be the same or may differ. These groups are exemplified as before. The organopolysiloxane comprising the component (iv) as defined above is generally known as a DTQ silicone resin.

Component (II) in the subject preparative method for component (B) is the component that introduces the epoxy-containing organic group into the epoxy-functional silicone resin comprising component (B). Component (II) consists of at least one epoxy-containing alkoxysilane with the general formula

$$R^7R^8{}_d Si(OR^9)_{(3-d)}$$

or the partial hydrolyzate thereof. $R^7$ and $R^8$ in the preceding formula are selected from epoxy-containing organic groups, such as 2,3-epoxypropyl, 3,4-epoxybutyl, 4,5-epoxypentyl, 2-glycidoxyethyl, 3-glycidoxypropyl, 4-glycidoxybutyl, 2-(3,4-epoxycyclohexyl)ethyl, and 3-(3,4-epoxycyclohexyl)propyl, or monovalent hydrocarbon groups, such as the monovalent hydrocarbon groups provided above as exemplary of $R^4$. At least one $R^7$ is an epoxy-containing group. $R^9$ in the preceding formula represents alkyl groups, and the alkyl groups comprising $R^9$ are specifically exemplified by methyl, ethyl, propyl, butyl, pentyl, hexyl, and heptyl. The subscript d in the preceding formula is zero or 1. When d=zero, component (II) consists of epoxy-containing trialkoxysilane or the partial hydrolyzate thereof. When d=1, component (II) consists of epoxy-containing organodialkoxysilane or the partial hydrolyzate thereof.

The epoxy-containing organodialkoxysilanes encompassed by component (II) are specifically exemplified by 3-glycidoxypropyl(methyl)dimethoxysilane, 3-glycidoxypropyl(methyl)diethoxysilane, 3-glycidoxypropyl(methyl)dibutoxysilane, 2-(3,4-epoxycyclohexyl)ethyl(methyl)dimethoxysilane, 2,3-(3,4-epoxycyclohexyl)ethyl(phenyl)diethoxysilane, 2,3-epoxypropyl(methyl)dimethoxysilane, and 2,3-epoxypropyl(phenyl)dimethoxysilane.

The epoxy-containing trialkoxysilanes encompassed by component (II) are specifically exemplified by 3-glycidoxypropyltrimethoxysilane, 3-glycidoxypropyltriethoxysilane, 3-glycidoxypropyltributoxysilane, 2-(3,4-epoxycyclohexyl)ethyltrimethoxysilane, 2-(3,4-epoxycyclohexyl)ethyltriethoxysilane, 2,3-epoxypropyltrimethoxysilane, and 2,3-epoxypropyltriethoxysilane.

Silicone resin is synthesized in accordance with the subject preparative method for component (B) by reacting the aforementioned components (I) and (II) in the presence of water and basic catalyst. Another alkoxysilane (or hydrolyzate thereof) may be added on an optional basis in this preparative method in addition to component (II). This alkoxysilane is specifically exemplified by methyltrimethoxysilane, methyltriethoxysilane, ethyltrimethoxysilane, ethyltriethoxysilane, vinyltrimethoxysilane, phenyltrimethoxysilane, 3,3,3-trifluoropropyltrimethoxysilane, dimethyldimethoxysilane, methylphenyldimethoxysilane, methylvinyldimethoxysilane, diphenyldimethoxysilane, dimethyldiethoxysilane, methylphenyldiethoxysilane, tetramethoxysilane, tetraethoxysilane, tetrapropoxysilane, and dimethoxydiethoxysilane.

Component (II) must be added in the subject preparative method for component (B) in a quantity such that the epoxy-containing organic groups in component (II) make up 0.1 to 40 mole % of the total silicon-bonded organic groups in components (I) and (II). Of course, the structure of component (II) must also be consistent with this result (i.e., the selection of $R^7$ and $R^8$). When component (II) is added in a quantity such that the epoxy-containing organic groups in component (II) make up less than 0.1 mole % of the total silicon-bonded organic groups in components (I) and (II), epoxy-containing organic groups will then make up less than 0.1 mole % of the total silicon-bonded organic groups in the final epoxy-containing silicone resin. This results in a substantial decline in reactivity between the epoxy-containing silicone resin and the curable resin, which in turn prevents a satisfactory modification of the physical properties of the curable resin. On the other hand, when component (II) is added in a quantity such that the epoxy-containing organic groups in component (II) make up more than 40 mole % of the total silicon-bonded organic groups in components (I) and (II), epoxy-containing organic groups will then make up more than 40 mole % of the total silicon-bonded organic groups in the final epoxy-containing silicone resin. When such an epoxy-containing silicone resin is reacted with curable resin, large amounts of epoxy-containing organic group in component (II) will not participate in the reaction and will remain unreacted. This in turn results in a decline in the heat resistance of the final cured resin.

No specific restriction applies to the amount of water added in the subject preparative method for component (B) as long as enough water is added to provide a thorough hydrolysis of the silicon-bonded alkoxy groups in component (II). The basic catalyst is a catalyst of the reaction between components (I) and (II), and this basic catalyst is specifically exemplified by alkali metal hydroxides such as sodium hydroxide, potassium hydroxide, and cesium hydroxide; alkali metal alkoxides such as sodium tert-butoxide, potassium tert-butoxide, and cesium tert-butoxide; and alkali metal silanolate compounds such as sodium silanolate compounds, potassium silanolate compounds, and cesium silanolate compounds. Potassium-containing catalysts and cesium-containing catalysts are particularly preferred.

In executing the subject preparative method for component (B), the basic catalyst may be directly added in its solid form, or it may be added dissolved in a small amount of water or starting polysiloxane. No specific restriction applies to the quantity of addition of this basic catalyst, but the preferred addition is 10 ppm to 10,000 ppm referred to the total quantity of components (I) and (II) and the particularly preferred addition is 100 ppm to 5,000 ppm referred to the total quantity of components (I) and (II).

The use of organic solvent in the subject reaction is preferred in order to inhibit precipitation of the nascent silicone resin from the reaction system. The organic solvent used for this purpose should be selected as appropriate as a function of the type and properties of the silicone resin product. However, the organic solvent under consideration can be specifically exemplified by aromatic organic solvents such as toluene, and xylene; ketone organic solvents such as acetone, and methyl isobutyl ketone; and aliphatic organic solvents such as hexane, heptane, and octane. Aromatic organic solvents are preferred. The use of organic solvent also offers the advantage of enabling the azeotropic removal from the silicone resin product of any excess water and water evolved by the condensation reaction of the silicone resin.

The reaction conditions used in the subject reaction are not specifically restricted. However, reaction temperatures of 80° C. to 200° C. are preferred and reaction temperatures of 100° C. to 150° C. are particularly preferred because these temperatures afford a smooth development of the reactions (hydrolysis reaction, condensation reaction, and so forth).

When an organic solvent is used, the hydrolysis and condensation reactions can be easily run by heating under reflux through the selection of an organic solvent with a boiling point in the range of 80° C. to 200° C.

In the next step of the subject preparative method for component (B), the concentration of the silicone resin obtained by the preceding reaction is adjusted with organic solvent and this silicone resin is then subjected to an equilibration reaction using a basic catalyst. Insofar as concerns the organic solvent used in this equilibration reaction, the same solvent as used in the preceding reaction can be used again, or a different solvent can be added. The different solvent that can be added here is exemplified by the organic solvents provided as exemplary above. Insofar as concerns the basic catalyst used in this equilibration reaction, the basic catalyst used in the preceding reaction can continue to be used or a new catalyst can be added. The new basic catalyst that can be added here is exemplified by the basic catalysts provided as exemplary above.

Although the concentration of the silicone resin is adjusted with organic solvent for this equilibration reaction, this concentration is not specifically restricted, and a concentration must be selected in the subject preparative method for component (B) that is suitable for the synthesis of epoxy-containing silicone resin having the desired molecular weight, softening point, and glass-transition temperature in the range of −90° C. to 150° C. Moreover, the organic solvent used in this equilibration reaction has the additional desirable effects of inhibiting precipitation of the epoxy-containing silicone resin produced by the equilibration reaction and lowering and thereby restraining the viscosity of the reaction system.

No specific restrictions apply with regard to the equilibration reaction conditions in the aforementioned equilibration reaction. The epoxy-containing silicone resin product reaches an equilibrated state due to the random occurrence of siloxane bond cleavage and reformation during the equilibration reaction. Given that the equilibration reaction cannot thoroughly develop at low reaction temperatures and that excessively high reaction temperatures result in thermal decomposition of the silicon-bonded organic groups, the reaction temperature in the subject preparative method for component (B) preferably falls in the range of 80° C. to 200° C. and particularly preferably falls in the range of 100° C. to 150° C. By selecting an organic solvent with a boiling point in the range of 80° C. to 200° C., the equilibration reaction can easily be run by heating under reflux.

It will be highly advantageous to monitor the development of the equilibration reaction by removing small quantities of the reaction solution and measuring the properties of the epoxy-containing silicone resin afforded by sample neutralization. With regard to the particular properties that may be measured here, measurement of the molecular weight is most preferred. When the epoxy-containing silicone resin is a liquid at ambient temperature, measurement of its viscosity will also be desirable. When the epoxy-containing silicone resin is a solid at ambient temperature, it will be advantageous to also measure its glass-transition temperature and/or its softening point. The end point of the equilibration reaction can be determined using the property values measured for the epoxy-containing silicone resin in this manner.

Upon reaching the aforesaid end point of the equilibration reaction, the reaction can be immediately stopped in the subject preparative method for component (B). But in addition, for the purpose of making small adjustments in the molecular weight of the epoxy-containing silicone resin, the equilibration reaction can be run with an additional fine-tuning of the silicone resin concentration through the addition or removal of organic solvent. Thus, when organic solvent is added and the silicone resin concentration is lowered, equilibration is then reached in due course at a lower molecular weight for the epoxy-containing silicone resin product. On the other hand, when organic solvent is removed and the concentration of the silicone resin is increased, equilibration is then reached in due course at a higher molecular weight for the epoxy-containing silicone resin product. This process is preferably run as a finishing step at or after the aforesaid end point of the equilibration reaction. Because this process makes possible regulation of the molecular weight, softening point, and glass-transition temperature (−90° C. to 150° C.) according to target values prior to removal of the epoxy-containing silicone resin from the reactor, epoxy-containing silicone resin having desired or selected values for the molecular weight, glass-transition temperature in the range of −90° C. to 150° C., and softening point can be prepared in a highly reproducible manner.

No particular restrictions apply to the method for neutralizing the basic catalyst at the aforesaid end point of the equilibration reaction, but neutralization by the addition of a weak acid, e.g., carbon dioxide, carboxylic acid, etc., is preferred. The salt produced by neutralization can be easily removed by filtration or washing with water.

The curable resin composition of the present invention must contain 0.1 to 500 weight parts component (B) per 100 weight parts component (A), and preferably contains 0.5 to 100 weight parts component (B) per 100 weight parts component (A). A cured resin having an excellent flexibility, moisture resistance, and heat-shock resistance cannot be obtained when less than 0.1 weight part component (B) is used per 100 weight parts component (A). On the other hand, the mechanical strength of the cured resin is substantially reduced when more than 500 weight parts component (B) is used per 100 weight parts component (A).

The curable resin composition in accordance with the present invention is obtained by mixing components (A) and (B) as described above to homogeneity. The method for mixing components (A) and (B) to homogeneity is not specifically restricted, and the mixing method used here is specifically exemplified as follows: (a) the simultaneous mixing of components (A) and (B), filler, and other components; (b) first mixing components (A) and (B), then admixing filler and other components; (c) first mixing filler and other components into component (A) and then admixing component (B); and (d) first mixing filler and other components into component (B) and then admixing component (A). Moreover, no specific restrictions apply to the device used to mix components (A) and (B), and the mixing device is preferably selected that is optimal for the physical condition of components (A) and (B) (liquid, solid, powder, and so forth). Such devices are specifically exemplified by single-screw continuous mixers, twin-screw continuous mixers, two-roll mills, Ross mixers, and kneader mixers.

By virtue of its excellent fluidity, the curable resin composition in accordance with the present invention can be used by such methods as transfer molding, injection molding, potting, casting, powder coating, immersion coating, dripping, and so forth. In addition, because the curable resin composition of the present invention cures to yield resin having an excellent flexibility, moisture resistance, and heat-shock resistance, it can be used as a sealant resin composition for electrical/electronic elements, as a paint or coating, as an adhesive, and so forth.

EXAMPLES

The curable resin composition in accordance with the present invention is explained below in greater detail through working examples. The following abbreviations are used in the examples and formulas: $M_n$ for number-average molecular weight, $M_w$ for weight-average molecular weight, Ph for phenyl, Me for methyl, and Ep for 3-glycidoxypropyl. The viscosity reported in the examples was measured at 25° C. The various properties of the curable resin compositions and cured resins were measured by the following methods.

Spiral flow

The spiral flow was measured by the method stipulated in the EMMI standard.

Mold shrinkage

The mold shrinkage was measured by the method stipulated in JIS K-6911.

Thermal expansivity

The thermal expansivity was measured on a molded cured resin specimen (5 mm×5 mm×16 mm) using a thermal expansion instrument (DL-7000 from the Shinku Riko Company). The thermal expansivity value is the value from room temperature to the glass-transition temperature.

Glass-transition temperature ($T_g$)

The glass-transition temperature was measured by measurement of the thermal expansivity.

Flexural modulus

The flexural modulus was measured by the method stipulated in JIS K-6911.

Water absorption

A molded cured resin specimen (2 inches×0.5 inches×0.25 inches) was brought to 121° C. and 100% humidity, and the weight gain by the cured resin was measured immediately after humidification for 20 hours.

Flash

The flash length was measured by injecting the composition into a mold having a groove with a depth of 20 micrometers.

Heat-shock resistance 20 resin-sealed semiconductor devices were molded (chip size=36 mm$^2$, package thickness=2.0 mm). These were then subjected to thermal cycle testing using a 1-minute cycle between −196° C. and +150° C. The sealant resin surfaces were examined with a stereoscopic microscope after 150 cycles, and the heat-shock resistance was rated according to the following scale.

++ : 5 or fewer moldings have cracks in the surface

+ : 6 to 10 moldings have cracks in the surface x : 11 or more moldings have cracks in the surface Solder heat resistance 20 resin-sealed semiconductor devices were molded (chip size=36 mm$^2$, package thickness=2.0 mm). These were maintained for 72 hours at 85° C./85% RH and then were immediately immersed for 1 hour in a solder bath at 240° C. The sealant resin -0 surfaces were subsequently examined with a stereoscopic microscope, and the solder heat resistance was rated according to the following scale.

++ : 5 or fewer moldings have cracks in the surface

+ : 6 to 10 moldings have cracks in the surface x : 11 or more moldings have cracks in the surface

REFERENCE EXAMPLE 1

250 g water and 400 g toluene were placed in a reactor and a mixture of 300 g phenyltrichlorosilane and 200 g toluene was dripped into the system while maintaining the liquid temperature in the system at 10° C. Heating under reflux was carried out for an additional 6 hours after the completion of addition. After this, the toluene solution was separated and repeatedly washed with 300 g water until the wash solution became neutral. The toluene was then distilled from the toluene solution by heating under reduced pressure to yield 177.7 g of a white solid (this is referred to below as sample A).

REFERENCE EXAMPLE 2

100 g water, 400 g toluene, and 140 g isopropanol were placed in a reactor and a mixture of 336.7 g phenyltrichlorosilane, 126 g dimethyldichlorosilane, and 126 g toluene was dripped into the system while maintaining the liquid temperature in the system at 10° C. Heating under reflux was carried out for an additional 1 hour after the completion of addition. After this, the toluene solution was separated and repeatedly washed with 300 g water until the wash solution became neutral to yield 452 g of a toluene solution containing 50 weight % as solids of organopolysiloxane (this is referred to below as sample B).

REFERENCE EXAMPLE 3

100 g water, 400 g toluene, and 140 g isopropanol were placed in a reactor and a mixture of 317.3 g phenyltrichlorosilane, 38.7 g dimethyldichlorosilane, 34.0 g tetrachlorosilane, and 126 g toluene was dripped into the system while maintaining the liquid temperature in the system at 10° C. Heating under reflux was carried out for an additional 1 hour after the completion of addition. After this, the toluene solution was separated and repeatedly washed with 300 g water until the wash solution became neutral to yield 438 g of a toluene solution containing 50 weight % as solids of organopolysiloxane (this toluene solution is referred to below as sample C).

REFERENCE EXAMPLE 4

51.6 g sample A, 23.6 g 3-glycidoxypropyltrimethoxysilane, 159.4 g toluene, and 0.08 g cesium hydroxide were introduced into a reactor. 5.0 g water was subsequently added to the system, and the system was then heated while distilling the evolved methanol and water. The system was cooled after the distillation of water had ceased. This process (addition of another 5.0 g water to the system and then distillation of the evolved methanol and water while heating the system) was carried out repeatedly, and heating was finally ended when no methanol production was observed (determined by extraction of the distilled water with ether and running gas chromatography thereon). The solids concentration was then adjusted to 30 weight %, and heating at reflux was carried out again. Sampling was carried out each hour, and the molecular weight of each sample was measured by gel permeation chromatography (GPC) after neutralization work-up. The system was cooled after it had been confirmed that the molecular weight distribution had become constant. After cooling, 0.05 g acetic acid was added to the system for neutralization. The salt product was then filtered off and the filtrate was heated under reduced pressure to afford 64.7 g of a colorless and transparent solid. This colorless, transparent solid gave the following values: $M_n$=2,300, $M_w$=3,820, glass-transition temperature= 106° C., softening point=142° C., epoxy equivalent weight=680. This colorless, transparent solid was confirmed by $^{29}$Si nuclear magnetic resonance spectroscopic analysis (NMR) to be a 3-glycidoxypropyl-containing silicone resin with the following structural formula.

$(PhSiO_{3/2})_{0.8}(EpSiO_{3/2})_{0.2}$

REFERENCE EXAMPLE 5

116.9 g sample B, 3.7 g octamethyltetracyclosiloxane, 12.1 g 3-glycidoxypropyltrimethoxysilane, 12.1 g toluene, and 0.08 g cesium hydroxide were introduced into a reactor. 5.0 g water was subsequently added to the system, and the system was then heated while distilling the evolved methanol and water. The system was cooled after the distillation of water had ceased. This process (addition of another 5.0 g water to the system and then distillation of the evolved methanol and water while heating the system) was carried out repeatedly, and heating was finally ended when no methanol production was observed. The solids concentration was then adjusted to 50 weight %, and heating at reflux was carried out again. Sampling was carried out each hour, and the molecular weight of each sample was measured by GPC after neutralization work-up. The system was cooled after it had been confirmed that the molecular weight distribution had become constant. After cooling, 0.05 g acetic acid was added to the system for neutralization. The salt product was then filtered off and the filtrate was heated under reduced pressure to afford 67.4 g of a colorless and transparent solid. This colorless, transparent solid gave the following values: $M_n=2,320$, $M_w=3,950$, glass-transition temperature=42° C., softening point= 65° C., epoxy equivalent weight=1,470. This colorless, transparent solid was confirmed by $^{29}$Si-NMR to be a 3-glycidoxypropyl-containing silicone resin with the following structural formula.

$(PhSiO_{3/2})_{0.66}[(CH_3)_2SiO_{2/2}]_{0.26}(EpSiO_{3/2})_{0.08}$

REFERENCE EXAMPLE 6

12.9 g sample A, 25.9 g octamethyltetracyclosiloxane, 11.8 g 3-glycidoxypropyltrimethoxysilane, 47.2 g toluene, and 0.05 g cesium hydroxide were introduced into a reactor. 5.0 g water was subsequently added to the system, and the system was then heated while distilling the evolved methanol and water. The system was cooled after the distillation of water had ceased. This process (addition of another 5.0 g water to the system and then distillation of the evolved methanol and water while heating the system) was carried out repeatedly, and heating was finally ended when no methanol production was observed. The solids concentration was then adjusted to 50 weight %, and heating at reflux was carried out again. Sampling was carried out each hour, and the molecular weight of each sample was measured by GPC after neutralization work-up. The system was cooled after it had been confirmed that the molecular weight distribution had become constant. After cooling, 0.03 g acetic acid was added to the system for neutralization. The salt product was then filtered off and the filtrate was heated under reduced pressure to afford 44.8 g of a colorless and transparent liquid. This colorless, transparent liquid gave the following values: $M_n=2,240$, $M_w=4,870$, glass-transition temperature=−68° C., viscosity=1,500 centipoise, epoxy equivalent weight=952. This colorless, transparent liquid was confirmed by $^{29}$Si-NMR to be a 3-glycidoxypropyl-containing silicone resin with the following structural formula.

$(PhSiO_{3/2})_{0.2}[(CH_3)_2SiO_{2/2}]_{0.7}(EpSiO_{3/2})_{0.1}$

REFERENCE EXAMPLE 7

113.9 g sample B, 11.8 g 3-glycidoxypropyltrimethoxysilane, 8.4 g toluene, and 0.08 g cesium hydroxide were introduced into a reactor. 5.0 g water was subsequently added to the system, and the system was then heated while distilling the evolved methanol and water. The system was cooled after the distillation of water had ceased. This process (addition of another 5.0 g water to the system and then distillation of the evolved methanol and water while heating the system) was carried out repeatedly, and heating was finally ended when no methanol production was observed. The solids concentration was then adjusted to 50 weight %, and heating at reflux was carried out again. Sampling was carried out each hour, and the molecular weight of each sample was measured by GPC after neutralization work-up. The system was cooled after it had been confirmed that the molecular weight distribution had become constant. After cooling, 0.05 g acetic acid was added to the system for neutralization. The salt product was then filtered off and the filtrate was heated under reduced pressure to afford 63.3 g of a colorless and transparent solid. This colorless, transparent solid gave the following values: $M_n=3,870$, $M_w=7,280$, glass-transition temperature=124° C., softening point=158° C., epoxy equivalent weight=1,340. This colorless, transparent solid was confirmed by 29Si-NMR to be a 3-glycidoxypropyl-containing silicone resin with the following structural formula.

$(PhSiO_{3/2})_{0.68}[(CH_3)_2SiO_{2/2}]_{0.14}(EpSiO_{3/2})_{0.09}$

REFERENCE EXAMPLE 8

48.4 g sample A, 8.9 g octamethyltetracyclosiloxane, 1.1 g 3-glycidoxypropylmethyldimethoxysilane, 58.2 g toluene, and 0.07 g cesium hydroxide were introduced into a reactor. 5.0 g water was subsequently added to the system, and the system was then heated while distilling the evolved methanol and water. The system was cooled after the distillation of water had ceased. This process (addition of another 5.0 g water to the system and then distillation of the evolved methanol and water while heating the system) was carried out repeatedly, and heating was finally ended when no methanol production was observed. The solids concentration was then adjusted to 50 weight %, and heating at reflux was carried out again. Sampling was carried out each hour, and the molecular weight of each sample was measured by GPC after neutralization work-up. The system was cooled after it had been confirmed that the molecular weight distribution had become constant. After cooling, 0.04 g acetic acid was added to the system for neutralization. The salt product was then filtered off and the filtrate was heated under reduced pressure to afford 54.7 g of a colorless and transparent solid. This colorless, transparent solid gave the following values: $M_n=2,740$, $M_w=4,520$, glass-transition temperature=52° C., softening point= 80° C., epoxy equivalent weight=11,900. This colorless, transparent solid was confirmed by $^{29}$Si-NMR to be a 3-glycidoxypropyl-containing silicone resin with the following structural formula.

$(PhSiO_{3/2})_{0.75}[(CH_3)_2SiO_{2/2}]_{0.24}(EP(CH_3)SiO_{2/2})_{0.01}$

REFERENCE EXAMPLE 9

An epoxy-functional silicone resin was prepared in accordance with the method for the preparation of silicone resin that is given in Reference Example 2 of Japanese Patent Application Laid Open Number Sho 56-136816. 240.4 g dimethyldimethoxysilane and 236.3 g 3-glycidoxypropyltrimethoxysilane were placed in a reactor. The temperature of this system was raised to 60° C., and 36 g water was gradually dripped in while stirring. Heating and stirring were carried out for an additional 4 hours after the completion of addition. The residual water and methanol product were then removed at 60° C./10 mmHg to yield 261.9 g of a transparent and light brown liquid. Crystals of tetramethyldisiloxanediol precipitated when this liquid was allowed to stand at room temperature. Infrared spectroscopic analysis confirmed this liquid to be a 3-glycidoxypropyl-containing silicone resin that contained large amounts of methoxy group. A distinct glass-transition temperature was not exhibited when the glass-transition temperature of this silicone resin was measured.

REFERENCE EXAMPLE 10

100 g water, 400 g toluene, 140 g isopropyl alcohol, and 0.07 g potassium hydroxide were placed in a reactor. This system was cooled to 10° C. and a liquid mixture of 35.0 g phenyltrimethoxysilane, 8.1 g octamethyltetracyclosiloxane, and 0.0 g 3-glycidoxypropyltrimethoxysilane was dripped into the system. The reaction was heated under reflux for an additional 1 hour after the completion of addition and was thereafter cooled. The toluene layer was taken off after cooling, its temperature was raised to 60° C., and 36 g water was gradually dripped in while stirring. Heating while stirring was carried out for another 4 hours after the completion of addition. After cooling, 0.04 g acetic acid was added to the system and the potassium acetate product was filtered off. Heating the filtrate under reduced pressure yielded 38.0 g of a 3-glycidoxypropyl-containing silicone resin in the form of a colorless solid. The results of infrared spectroscopic analysis confirmed the presence of the silanol group in this silicone resin. In addition, this silicone resin did not exhibit a distinct glass-transition temperature.

REFERENCE EXAMPLE 11

42.6 g sample A, 8.1 g octamethylcyclotetrasiloxane, 10.0 g 3-glycidoxypropyltrimethoxysilane, 60.7 g toluene, and 0.07 g potassium hydroxide were introduced into a reactor. 5.0 g water was subsequently added to the system, and the system was then heated at reflux while distilling the evolved methanol and water. The reaction was cooled when the distillation of water had ceased. This process of water addition/heating at reflux/distillation of water and methanol/cooling was carried out repeatedly, and the presence/absence of methanol was determined by gas chromatography (GC) by extracting the distilled water with ether. It was confirmed that there was no methanol distillation in the fourth execution of the process. The concentration of the hydrolyzate product was adjusted to 50 weight % by adding or removing toluene as appropriate, and heating at reflux was carried out again. The reaction mixture was sampled each hour: the sample was in each case neutralized and its molecular weight was determined by gel permeation chromatography (GPC). The molecular weight of the sample became constant after 6 hours, and the system was then cooled. After cooling, 0.04 g acetic acid was added and the resulting potassium acetate was filtered off. Heating the filtrate under reduced pressure gave 57.7 g of a 3-glycidoxypropyl-containing silicone resin in the form of a colorless solid. This silicone resin gave the following values: $M_n=3,210$, $M_w=5,260$, glass-transition temperature=68° C., softening point=102° C., and glycidoxypropyl group content= 9.8 mole %. It was determined to have the following structural formula by $^{29}$Si nuclear magnetic resonance analysis (NMR).

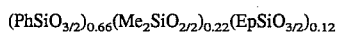

REFERENCE EXAMPLE 12

45.2 g sample A, 6.7 g octamethylcyclotetrasiloxane, 1.8 g 3-glycidoxypropyltrimethoxysilane, 61.1 g toluene, and 0.06 g potassium hydroxide were introduced into a reactor. 5.0 g water was subsequently added to the system, and the system was then heated at reflux while distilling the evolved methanol and water. The reaction was cooled when the distillation of water had ceased. This process of water addition/heating at reflux/distillation of water and methanol/cooling was carried out repeatedly, and the presence/absence of methanol was determined by GC by extracting the distilled water with ether. It was confirmed that there was no methanol distillation in the fourth execution of the process. The concentration of the hydrolyzate product was adjusted to 40 weight % by adding or removing toluene as appropriate, and heating at reflux was carried out again. The reaction mixture was sampled after 6 hours, and neutralization work-up of this sample afforded 3-glycidoxypropyl-containing silicone resin (I).

The reaction mixture concentration was adjusted to 60 weight % by the distillation of part of the toluene, and heating at reflux was carried out again. A sample of the reaction mixture was taken after 6 hours, and neutralization work-up of this sample afforded 3-glycidoxypropyl-containing silicone resin (II).

The reaction mixture concentration was adjusted to 40 weight % by the addition of toluene, and heating at reflux was carried out again. A sample of the reaction mixture was taken after 6 hours, and neutralization work-up of this sample afforded 3-glycidoxypropyl-containing silicone resin (III).

The reaction mixture concentration was subsequently adjusted to 60 weight % by the distillation of part of the toluene, and heating at reflux was carried out again. A sample of the reaction mixture was taken after 6 hours, and neutralization work-up of this sample afforded 3-glycidoxypropyl-containing silicone resin (IV).

Table 1 reports the molecular weight, physical properties, and structure (determined by $^{29}$Si NMR) of the 3-glycidoxypropyl-containing silicone resins obtained in the preceding processes. The results in the table demonstrate that it is possible, through the free adjustment of the concentration of the hydrolyzate product or reaction mixture, to reversibly and highly reproducibly synthesize 3-glycidoxypropyl-containing silicone resin having a selected, desired molecular weight, glass-transition temperature, and softening point. At the same time, the structure of the silicone resin and its 3-glycidoxypropyl content remain constant.

TABLE 1

| 3-glycidoxypropyl-containing silicone resin | | I | II | III | IV |
|---|---|---|---|---|---|
| number-average molecular weight | ($M_n$) | 2930 | 3560 | 2880 | 3530 |
| weight-average molecular weight | ($M_w$) | 4810 | 5640 | 4750 | 5620 |
| glass-transition temperature | (°C.) | 65 | 89 | 63 | 90 |
| softening point | (°C.) | 96 | 120 | 95 | 122 |
| 3-glycidoxypropyl group content | (mol %) | 10.2 | 10.2 | 10.2 | 10.2 |
| results of $^{29}$Si nuclear magnetic resonance analysis | | | | | |
| $C_6H_5SiO_{3/2}$ | (mol %) | 70 | 69 | 69 | 69 |
| $(CH_3)_2SiO_{2/2}$ | (mol %) | 18 | 19 | 19 | 19 |
|  | (mol %) | 12 | 12 | 12 | 12 |

REFERENCE EXAMPLE 13

116.9 g sample B, 11.8 g 3-glycidoxypropyltrimethoxysilane, 8.4 g toluene, and 0.08 g cesium hydroxide were introduced into a reactor. 5.0 g water was subsequently added to the system, and the system was then heated at reflux while distilling the evolved methanol and water. The reaction was cooled when the distillation of water had ceased. This process water addition/heating at reflux/distillation of water and methanol/cooling was carried out repeatedly, and the presence/absence of methanol was determined by GC by extracting the distilled water with ether. It was confirmed that there was no methanol distillation in the fourth execution of the process. The concentration of the reaction mixture was then adjusted to 50 weight % by adding or removing toluene as appropriate, and heating at reflux was carried out again. Sampling was carried out each hour, and the molecular weight of each sample was measured by GPC after neutralization work-up. After 4 hours it was determined that the molecular weight had become constant, and the reaction was then cooled. After cooling, 0.04 g acetic acid was added to the system, and the cesium acetate product was filtered off. Heating the filtrate under reduced pressure yielded 64.2 g of a 3-glycidoxypropyl-containing silicone resin in the form of a colorless solid. This silicone resin gave the following values: $M_n$=2,980, $M_w$=4,880, glass-transition temperature=68° C, softening point=98° C., and 3-glycidoxypropyl content=7.5 mole %. The following structural formula was determined by $^{29}$Si-N MR.

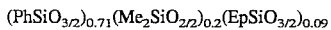

$(PhSiO_{3/2})_{0.71}(Me_2SiO_{2/2})_{0.2}(EpSiO_{3/2})_{0.09}$

REFERENCE EXAMPLE 14

6.5 g sample A, 116.9 g sample B, 11.8 g 3-glycidoxypropyltrimethoxysilane, 14.9 g toluene, and 0.08 g cesium hydroxide were introduced into a reactor. 5.0 g water was subsequently added to the system, and the system was then heated at reflux while distilling the evolved methanol and water. The reaction was cooled when the distillation of water had ceased. This process of water addition/heating at reflux/distillation of water and methanol/cooling was carried out repeatedly, and the presence/absence of methanol was determined by GC by extracting the distilled water with ether. It was confirmed that there was no methanol distillation in the fourth execution of the process. The concentration of the reaction mixture was then adjusted to 50 weight % by adding or removing toluene as appropriate, and heating at reflux was carried out again. Sampling was carried out each hour, and the molecular weight of each sample was measured by GPC after neutralization work-up. After 4 hours it was determined that the molecular weight had become constant, and the reaction was then cooled. After cooling, 0.04 g acetic acid was added to the system, and the cesium acetate product was filtered off. Heating the filtrate under reduced pressure yielded 71.0 g of a 3-glycidoxypropyl-containing silicone resin in the form of a colorless solid. This silicone resin gave the following values: $M_n$=3,250, $M_w$=5,420, glass-transition temperature=80° C., softening point=112° C., and 3-glycidoxypropyl content=6.8 mole %. The following structural formula was determined by $^{29}$Si:NMR.

$(PhSiO_{3/2})_{0.73}(Me_2SiO_{2/2})_{0.18}(EpSiO_{3/2})_{0.08}$

REFERENCE EXAMPLE 15

6.5 g sample A, 116.9 g sample B, 3.7 g octamethyltetracyclosiloxane, 11.8 g 3-glycidoxypropyltrimethoxysilane, 18.6 g toluene, and 0.08 g cesium hydroxide were introduced into a reactor. 5.0 g water was subsequently added to the system, and the system was then heated at reflux while distilling the evolved methanol and water. The reaction was cooled when the distillation of water had ceased. This process of water addition/heating at reflux/distillation of water and methanol/cooling was carried out repeatedly, and the presence/absence of methanol was determined by GC by extracting the distilled water with ether. It was confirmed that there was no methanol distillation in the fourth execution of the process. The concentration of the reaction mixture was then adjusted to 50 weight % by adding or removing toluene as appropriate, and heating at reflux was carried out again. Sampling was carried out each hour, and the molecular weight of each sample was measured by GPC after neutralization work-up. After 6 hours it was determined that the molecular weight had become constant, and the reaction was then cooled. After cooling, 0.04 g acetic acid was added to the system, and the cesium acetate product was filtered off. Heating the filtrate under reduced pressure yielded 72.4 g of a 3-glycidoxypropyl-containing silicone resin in the form of a colorless solid. This silicone resin gave the following values: $M_n$=2,540, $M_w$=4,270, glass-transition temperature=44° C., softening point=68° C., and 3-glycidoxypropyl content=6.4 mole %. The following structural formula was determined by $^{29}$Si-N MR.

$$(PhSiO_{3/2})_{0.68}(Me_2SiO_{2/2})_{0.25}(EpSiO_{3/2})_{0.08}$$

REFERENCE EXAMPLE 16

100 g water, 400 g toluene, 140 g isopropyl alcohol, and 0.07 g potassium hydroxide were placed in a reactor. Into this system was then dripped a liquid mixture of 35.0 g phenyltrimethoxysilane, 8.1 g octamethylcyclotetrasiloxane, and 10.0 g 3-glycidoxypropyltrimethoxysilane. The reaction was heated under reflux for an additional 1 hour after the completion of addition and was thereafter cooled. The toluene layer was taken off after cooling and heated for 6 hours under reflux in order to azeotropically eliminate the water. After this, 0.04 g acetic acid was added to the system and the potassium acetate product was filtered off. The toluene was then removed from the filtrate by heating under reduced pressure to yield 38.0 g of a 3-glycidoxypropyl-containing silicone resin in the form of a colorless solid. When measurement of the glass-transition temperature of this 3-glycidoxypropyl-containing silicone resin was attempted, it was found that this material did not exhibit a distinct glass-transition temperature.

EXAMPLE 1

100 weight parts of a phenol novolac resin (softening point=80° C., hydroxyl group equivalent weight=100), 28.6 weight parts of the 3-glycidoxypropyl-containing silicone resin prepared in Reference Example 4, 185.7 weight parts fused silica powder, 11.4 weight parts hexamethylenetetramine, 1.0 weight part 3glycidoxypropyltrimethoxysilane, and 2.9 weight parts carnauba wax were mixed to homogeneity. Additional kneading on a hot roll at 90° C. and subsequent cooling afforded a curable resin composition in L0 accordance with the present invention. This was pulverized and transfer molded for 3 minutes at 175° C./70 kg/cm$^2$ and the cured resin was post-cured over a period of 2 hours at 150° C. The various properties of the curable resin composition and the cured resin are reported in Table 2.

COMPARISON EXAMPLE 1

A curable resin composition was prepared as in Example 1, but in this case replacing the 3-glycidoxypropyl-containing silicone resin of Reference Example 4 that was used in Example 1 with a dimethylpolysiloxane bearing the 3-glycidoxypropyl group in non-terminal position (see structural formula below). This composition was cured as in Example 1, and the various properties of the curable resin composition and the cured resin are reported in Table 2.

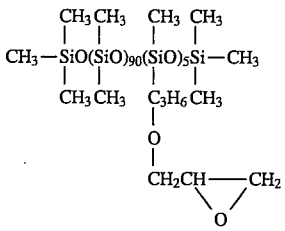

COMPARISON EXAMPLE 2

A curable resin composition was prepared as in Example 1, but in this case omitting the 3-glycidoxypropyl-containing silicone resin of Reference Example 4 that was used in Example 1. Curing was carried out as in Example 1. The various properties of the curable resin composition and the cured resin are reported in Table 2.

TABLE 2

| Item Measured | Present Invention Example 1 | Comparison Examples | |
|---|---|---|---|
| | | Comparison Example 1 | Comparison Example 2 |
| spiral flow (inches) | 38 | 35 | 31 |
| mold shrinkage (%) | 0.23 | 0.20 | 0.31 |
| thermal expansivity (×10$^{-5}$/°C.) | 1.18 | 1.05 | 1.50 |
| $T_g$(°C.) | 159 | 135 | 156 |
| flexural modulus (kgf/mm$^2$) | 1220 | 1250 | 1350 |
| water absorption (%) | 0.40 | 0.55 | 0.51 |

EXAMPLE 2

The following were mixed to homogeneity: 3.8 weight parts carnauba wax, 1.0 weight part 3-glycidoxypropyltrimethoxysilane, 3.5 weight parts aluminum acetylacetonate, 284.6 weight parts fused silica powder, 38.5 weight parts of the 3-glycidoxypropyl-containing silicone resin prepared in Reference Example 5, and 100 weight parts of a silicone-epoxy resin that consisted of 50 weight parts cresol novolac epoxy resin (softening point=80° C., epoxy equivalent weight=220) and 50 weight parts of a silicone resin (silicon-bonded hydroxyl content =5 weight %) composed of 40 mole % CH$_3$SiO$_{3/2}$ unit, 10 mole % C$_6$H$_5$(CH$_3$)SiO$_{2/2}$ unit, 40 mole % C$_6$H$_5$ SiO$_{3/2}$ unit, and 10 mole % (C$_6$H$_5$)$_2$SiO$_{2/2}$ unit. Additional kneading on a hot roll at 90° C. and subsequent cooling afforded a curable resin composition in accordance with the present invention. This was pulverized and transfer molded for 2 minutes at 175° C./70 kg/cm$^2$ and the cured resin was post-cured over a period of 12 hours at 180° C. The various properties of the curable resin composition and the cured resin are reported in Table 3.

EXAMPLE 3

A curable resin composition was prepared as in Example 2, but in this case replacing the 3-glycidoxypropyl-containing silicone resin of Reference Example 5 that was used in Example 2 with the 3-glycidoxypropyl-containing silicone resin whose preparation is described in Reference Example 6. Curing was carried out as in Example 2. The various properties of the curable resin composition and the cured resin are reported in Table 3.

EXAMPLE 4

A curable resin composition was prepared as in Example 2, but in this case replacing the 3-glycidoxypropyl-containing silicone resin of Reference Example 5 that was used in Example 2 with the 3-glycidoxypropyl-containing silicone resin whose preparation is described in Reference Example 7. Curing was carried out as in Example 2. The various properties of the curable resin composition and the cured resin are reported in Table 3.

COMPARISON EXAMPLE 3

A curable resin composition was prepared as in Example 2, but in this case replacing the 3-glycidoxypropyl-containing silicone resin of Reference Example 5 that was used in Example 2 with a dimethylpolysiloxane bearing the 3-glycidoxypropyl and trimethoxysilylethyl groups in nonterminal position (see structural formula below). Curing was carried out as in Example 2, and the various properties of the curable resin composition and the cured resin are reported in Table 3.

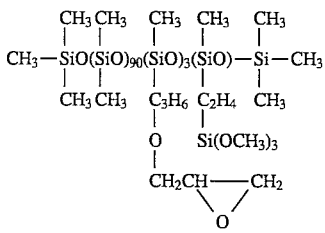

COMPARISON EXAMPLE 4

A curable resin composition was prepared as in Example 2, but in this case omitting the 3-glycidoxypropyl-containing silicone resin of Reference Example 5 that was used in Example 2. Curing was carried out as in Example 2. The various properties of the curable resin composition and the cured resin are reported in Table 3.

TABLE 3

| Item Measured | Present Invention | | | Comparison Examples | |
|---|---|---|---|---|---|
| | Example 2 | Example 3 | Example 4 | Comp. Example 3 | Comp. Example 4 |
| spiral flow (inches) | 43 | 45 | 41 | 40 | 35 |
| mold shrinkage (%) | 0.37 | 0.35 | 0.32 | 0.37 | 0.43 |
| thermal expansivity ($\times 10^{-5}$/°C.) | 2.30 | 2.11 | 2.26 | 2.90 | 2.75 |
| $T_g$(°C.) | 173 | 165 | 175 | 151 | 170 |
| flexural modulus (kgf/mm$^2$) | 1330 | 1310 | 1360 | 1250 | 1520 |
| water absorption (%) | 0.35 | 0.39 | 0.34 | 0.56 | 0.47 |
| flash (mm) | 3 | 6 | 2 | 15 | 4 |
| heat-shock resistance | ++ | ++ | ++ | + | x |
| solder heat resistance | ++ | ++ | ++ | x | x |

EXAMPLE 5

The following were mixed to homogeneity: 100 weight parts bismaleimide-triazine-type thermosetting polyimide resin, 28.6 weight parts 3-glycidoxypropyl-containing silicone resin as prepared in Reference Example 8, 185.7 weight parts fused silica powder, 2.9 weight parts carnauba wax, 1.0 weight part 3-glycidoxypropyltrimethoxysilane, and 0.9 weight parts aluminum benzoate. Additional kneading on a hot roll at 90° C. and subsequent cooling afforded a curable resin composition in accordance with the present invention. This was pulverized and transfer molded for 4 minutes at 220° C./70 kg/cm$^2$ and the cured resin was post-cured over a period of 3 hours at 230° C. The various properties of the curable resin composition and the cured resin are reported in Table 4.

COMPARISON EXAMPLE 5

A curable resin composition was prepared as in Example 5, but in this case omitting the 3-glycidoxypropyl-containing silicone resin of Reference Example 8 that was used in Example 5. Curing was carried out as in Example 5. The various properties of the curable resin composition and the cured resin are reported in Table 4.

TABLE 4

| Item Measured | Present Invention Example 5 | Comparison Examples Comparison Example 5 |
|---|---|---|
| spiral flow (inches) | 48 | 44 |
| flexural modulus (kgf/mm$^2$) | 1050 | 1220 |
| water absorption (%) | 0.61 | 0.82 |

EXAMPLE 6

The following were mixed to homogeneity: 75 weight parts ortho-cresol novolac epoxy resin (softening point=80° C., epoxy equivalent weight=220), 260 weight parts fused silica powder, 1 weight part carnauba wax, 35 weight parts phenol novolac resin, 0.6 weight parts triphenylphosphine, 10 weight parts 3-glycidoxypropyl-containing silicone resin as prepared in Reference Example 8, and 1.0 weight part 3-glycidoxypropyltrimethoxysilane. Additional kneading on a hot roll at 90° C. and subsequent cooling afforded a curable resin composition in accordance with the present invention. This was pulverized and transfer molded for 3 minutes at 150° C./70 kg/cm$^2$ and the cured resin was post-cured over a period of 4 hours at 180° C. The various properties of the curable resin composition and the cured resin are reported in Table 5.

EXAMPLE 7

A curable resin composition was prepared as in Example 6, but in this case replacing the 3-glycidoxypropyl-containing silicone resin of Reference Example 8 that was used in Example 6 with the 3-glycidoxypropyl-containing silicone resin whose preparation is described in Reference Example 5. Curing was carried out as in Example 6. The various properties of the curable resin composition and the cured resin are reported in Table 5.

COMPARISON EXAMPLE 6

A curable resin composition was prepared as in Example 6, but in this case omitting the 3-glycidoxypropyl-containing silicone resin of Reference Example 8 that was used in Example 6. Curing was carried out as in Example 6. The various properties of the curable resin composition and the cured resin are reported in Table 5.

COMPARISON EXAMPLE 7

A curable resin composition was prepared as in Example 6, but in this case replacing the 3-glycidoxypropyl-containing silicone resin of Reference Example 8 that was used in Example 6. with the 3-glycidoxypropyl-containing silicone resin whose preparation is described in Reference Example 9. Curing was carried out as in Example 6. The various properties of the curable resin composition and the cured resin are reported in Table 5. In addition, mold staining during molding was much greater for the curable resin composition prepared in Comparison Example 7 than for the curable resin compositions prepared in Examples 6 and 7.

COMPARISON EXAMPLE 8

A curable resin composition was prepared as in Example 6, but in this case replacing the 3-glycidoxypropyl-containing silicone resin of Reference Example 8 that was used in Example 6 with the 3-glycidoxypropyl-containing silicone resin whose preparation is described in Reference Example 10. Curing was carried out as in Example 6. The various properties of the curable resin composition and the cured resin are reported in Table 5.

TABLE 5

| Item Measured | Present Invention | | Comparison Examples | | |
|---|---|---|---|---|---|
| | Example 6 | Example 7 | Comp. Example 6 | Comp. Example 7 | Comp. Example 8 |
| spiral flow (inches) | 63 | 59 | 56 | 57 | 62 |
| mold shrinkage (%) | 0.35 | 0.32 | 0.43 | 0.43 | 0.41 |
| thermal expansivity ($\times 10^{-5}$/°C.) | 2.55 | 2.57 | 2.67 | 2.67 | 2.62 |
| $T_g$(°C.) | 142 | 143 | 135 | 125 | 127 |
| flexural modulus (kgf/mm$^2$) | 1260 | 1290 | 1420 | 1350 | 1290 |
| water absorption (%) | 0.49 | 0.52 | 0.53 | 0.55 | 0.52 |
| flash (mm) | 2 | 2 | 15 | 13 | 25 |
| heat-shock resistance | ++ | ++ | x | + | + |
| solder heat resistance | ++ | ++ | x | x | + |

That which is claimed is:

1. An epoxy group-containing silicone resin prepared by
   (A) reacting, in the presence of water and a basic catalyst,
   (I) at least one organopolysiloxane selected from the group consisting of
      (i) an organopolysiloxane consisting essentially of siloxane units with the general formula $R^4SiO_{3/2}$, (ii) an organopolysiloxane consisting essentially of siloxane units with the general formula $R^5R^6SiO_{2/2}$, (iii) an organopolysiloxane consisting essentially of siloxane units with the general formulas $R^4SiO_{3/2}$ and $R^5R^6SiO_{2/2}$ and
   (iv) organopolysiloxane consisting essentially of siloxane units with the general formulas $R^4SiO_{3/2}$, $R^5R^6SiO_{2/2}$ and $SiO_{4/2}$ wherein $R^4$, $R^5$ and $R^6$ are independently selected from monovalent hydrocarbon groups, with the proviso that said component (ii) is not used by itself as said organopolysiloxane (I) and (II) an epoxy-containing alkoxysilane with the general formula $R^7R^8_dSi(OR^9)_{(3-d)}$ or partial hydrolyzate thereof, wherein $R^7$ and $R^8$ is each selected from the group consisting of epoxy-containing organic groups and monovalent hydrocarbon groups, $R^9$ represents an alkyl group and d is zero or 1 and said component (II) is added in a quantity such that the epoxy-containing organic groups in component (II) comprise 0.1 to 40 mole percent of the total silicon-bonded organic groups in components (I) and (II); and (B) subjecting the reaction product of step (A) to an equilibration reaction.

2. The silicone resin according to claim 1, wherein $R^9$ is methyl.

3. The silicone resin according to claim 2, wherein said epoxy-containing organic group is selected from the group consisting of 2,3-epoxypropyl, 3,4-epoxybutyl, 4,5-epoxypentyl, 2-glycidoxyethyl, 3-glycidoxypropyl, 4-glycidoxybutyl, 2-(3,4-epoxycyclohexyl)ethyl, and 3-(3,4-epoxycyclohexyl)propyl.

4. The epoxy group-containing silicone resin according to claim 1, wherein at least 30 mole percent of the $R^4$ groups are phenyl radicals.

5. The epoxy group-containing silicone resin according to claim 2, wherein at least 30 mole percent of the $R^4$ groups are phenyl radicals.

6. The epoxy group-containing silicone resin according to claim 3, wherein at least 30 mole percent of the $R^4$ groups are phenyl radicals.

* * * * *